3,816,631
6-SULFAMOYL - 7 - SUBSTITUTED-4(3H)-QUINAZO-
LINONES FOR DECREASING URIC ACID
CONCENTRATION
Frederick C. Novello, Berwyn, Pa., assignor to Merck &
Co., Inc., Rahway, N.J.
No Drawing. Filed Oct. 12, 1972, Ser. No. 297,153
Int. Cl. A61k 27/00
U.S. Cl. 424—251                           5 Claims

ABSTRACT OF THE DISCLOSURE

Method for decreasing the concentration of uric acid in the blood and urine of a mammal by the administration of a 6-sulfamoyl-7-substituted-4(3H)-quinazolinone. The products employed in this method of treatment are prepared by conventional procedures such as heating the appropriately substituted anthranilic acid amide or a 2-acyl derivative thereof. The products effect the lowering of the uric acid level by virtue of their xanthine oxidase inhibiting properties.

---

This invention is concerned with a method of lowering the uric acid level in the blood and urine of a mammal by the administration of a 6-sulfamoyl-7-substituted-4-(3H)-quinazolinone, which products have been found to exhibit xanthine oxidase inhibiting properties comparable to that exhibited by allopurinol when all compounds are evaluated in the same in vitro test.

The products employed in the method of this invention have the structural formula

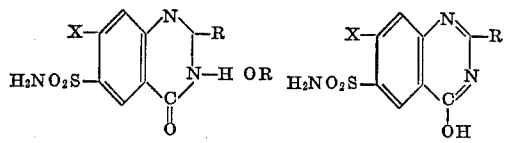

and pharmacologically acceptable salts thereof wherein X is halogen preferably chloro or bromo or trifluoromethyl and R is hydrogen, lower alkyl having from 1 to 5 carbon atoms optionally substituted with a chloro or hydroxy group, carboxyl or a lower alkyl ester ($C_{1-3}$) or amide derivative thereof. In the compounds illustrated above which have no substituent other than hydrogen on either nitrogen of the quinazolinone nucleus, tautomerism permits the structure of the compounds to be in either the keto or enol form. For convenience the compounds will hereinafter be identified as ketones but it is not intended to limit the structure to solely this configuration.

The active products of the method of this invention can be prepared by one or another of the well known procedures for making 6-sulfamoyl - 7 - substituted - 4(3H)-quinazolinones.

Products having the above structures advantageously can be prepared by heating a reaction mixture containing 2-amino-4-X-5-sulfamoylbenzamide and ethyl oxalyl chloride or formic acid depending upon the presence or absence of a substituent in the 2-position. A 2-carboxy substituted product can of course be converted to the acid or ester by conventional methods.

The alkali metal salts of the quinazolinone compounds can be prepared by any of the conventional methods such as by dissolving the selected quinazolinone compound in an aqueous or alcoholic solution of the alkali metal hydroxide and, if desired, isolating the salt by evaporating the solvent. Any of the conventional alkali metal salts can be prepared by this method or by other methods known to the workers in this art. The alkaline earth metal salts generally are prepared by replacement of the alkali metal by an alkaline earth metal, also by well known procedures.

As the active products of the method of this invention are inhibitors of xanthine oxidase, they effectively decrease the concentration of uric acid in the blood and urine of mammals, and additionally increase the excretion of hypoxanthine and xanthine. The method of this invention therefore is particularly useful in the treatment and management of gout preferably by oral administration of from about 100 to 800 mg. per day of the active products in divided doses as prescribed by the physician.

Conventional formulations can be employed in preparing dosage forms of the active agents to be employed in the method of this invention; the following formulation is illustrative of one suitable dosage form:

COMPRESSED TABLET CONTAINING 0.5 G. OF ACTIVE INGREDIENT

| | Grams |
|---|---|
| 6-sulfamoyl-7-trifluoromethyl - 4(3H) - quinazolinone | 500.0 |
| Starch paste 12.5%, 100 cc., allow | 12.5 |
| | 512.5 |
| Starch, U.S.P., corn | 25.0 |
| Magnesium stearate | 5.5 |
| | 543.0 |

The quinazolinone is granulated with the starch paste and while moist passed through a No. 14 screen, dried at 45° C. for 20 hours and then passed 3 times through a No. 14 screen. The starch then is passed through a No. 90 bolting cloth onto the granulation and all ingredients are blended thoroughly. Then the magnesium stearate is passed through a No. 90 bolting cloth onto the granulation and these ingredients are blended after which the granulation is compressed into tablets using $14\!\%_{32}$ in. flat, bevelled, scored punch having a thickness of 0.205±0.005 in. yielding 1,000 tablets, each weighing 0.543 gram.

The following examples describe the preparation of certain compounds used in the method of this invention. The methods described in the examples as well as prior art methods can be employed in making all of the products falling within the scope of the generic structure.

EXAMPLE 1

2-carbamoyl-6-sulfamoyl-7-chloro-4(3H)-quinazolinone

A mixture of 2-amino-4-chloro-5-sulfamoylbenzamide (0.01 mole) and ethyl oxalyl chloride (0.011 mole) in dioxane (200 ml.) is heated under reflux for 8 hours and then concentrated to dryness in vacuo. The residue is stirred at room temperature in concentrated ammonium hydroxide (100 ml.) for 18 hours and then acidified with hydrochloric acid. The product is collected and recrystallized from a mixture of diethylformamide and water to give product, m.p. 341–342° C.

Analysis.—Calculated for $C_9H_7ClN_4O_4S$: C, 35.71; H, 2.33; N, 18.51. Found: C, 36.04; H, 2.56; N, 18.32.

EXAMPLE 2

6-sulfamoyl-7-trifluoromethyl-4(3H)-quinazolinone

Step A: Preparation of 2-amino-5-sulfamoyl-4-trifluoromethylbenzamide. — 2-amino-4-trifluoromethylbenzamide (0.01 mole) is added portionwise over 15 minutes with stirring to chlorosulfonic acid (10 ml.) cooled in an ice bath. The solution is heated on the steam bath for 18 hours, cooled and poured onto ice. The solid is collected and added to liquid ammonia (50 ml.), the solution allowed to evaporate and the residue recrystallized from water yielding the 2-amino-5-sulfamoyl-4-trifluoromethylbenzamide.

Step B: Preparation of 6-sulfamoyl-7-trifluoromethyl-4(3H)-quinazolinone.—A solution of 2-amino-5-sulfamoyl-4-trifluoromethylbenzamide (0.01 mole) in 98–100% formic acid (50 ml.) is heated on the steam bath for one hour and then concentrated to dryness in vacuo. The residue is recrystallized from a mixture of dimethylformamide and water to give product, m.p. 285–287° C.

Analysis.—Calculated for $C_9H_6F_3N_3O_3S$: C, 36.86; H, 2.06; N, 14.33. Found: C, 37.29; H, 2.01; N, 14.05.

EXAMPLE 3

2-hydroxymethyl-6-sulfamoyl-7-chloro-4(3H)-quinazolinone

A mixture of 2-amino-4-chloro-5-sulfamoylbenzamide (0.01 mole) and ethyl oxalyl chloride (0.011 mole) in dioxane (75 ml.) is heated under reflux for one hour and concentrated to dryness in vacuo. The residue is dissolved in ethanol (100 ml.) containing potassium acetate (3 g.) and heated under reflux for 48 hours. The reaction mixture is diluted with water, acidified with hydrochloric acid and the product collected and recrystallized from a mixture of dimethylformamide and water yielding product, m.p. 238–240° C.

Analysis.—Calculated for $C_9H_8ClN_3O_4S$: C, 37.31; H, 2.78; N, 14.50. Found: C, 37.01; H, 2.76; N, 14.24.

EXAMPLE 4

2-chloromethyl-6-sulfamoyl-7-chloro-4(3H)-quinazolinone

This product is prepared by the procedure described in Example 3 except the ethanol and potassium acetate is replaced by methanol (75 ml.) saturated with hydrogen chloride. This mixture is refluxed for 2 hours, concentrated to dryness in vacuo and the residue recrystallized from a mixture of dimethylformamide and water to provide product, m.p. 271–273° C.

Analysis.—Calculated for $C_9H_7Cl_2N_3O_3S$: C, 35.08; H, 2.29; N, 13.64. Found: C, 34.95; H, 2.23; N, 13.48.

Representative 6-sulfamoyl-7-substituted-4(3H)-quinazolinone products found to be effective when tested by an art-recognized procedure designated to evaluate xanthine oxidase inhibiting properties of compounds are identified in the following table. The procedure used employed the principles described in J. Pharm. Sci., 56:955 (1967), Baker et al. and was carried out in the following manner:

A reference cuvette is filled with 0.05 M pH 7.4 buffer. For the control, mix quickly in a cuvette 2 ml. hypoxanthine solution ($6 \times 10^{-5}$ M), 2 ml. 0.05 M pH 7.4 buffer solution and 2 ml. xanthine oxidase solution, and immediately record the absorbance at 292μ for one minute. For the test solution, add quickly to a separate cuvette 2 ml. hypoxanthine solution ($6 \times 10^{-5}$ M), 2 ml. test solution, and 2 ml. xanthine oxidase solution, and immediately record the absorbance at 292μ for one minute. If the inhibition is less than 100%, the percent inhibition is calculated as follows:

$$\frac{\Delta A \text{ control} - \Delta A \text{ test}}{\Delta A \text{ control}} \times 100$$

where ΔA is the change in absorbance in one minute. If the inhibition is 100%, the test solution is serially diluted to determine the concentration required for 50% inhibition.

The percent inhibition effected by certain representative products employed in the method of this invention is provided in the following table. The concentration of the test compound was $2 \times 10^{-5}$ M unless otherwise noted. For comparison $3.2 \times 10^{-6}$ M of allopurinol, a known xanthine oxidase inhibiting agent, effects 50% inhibition of xanthine oxidase by this protocol.

TABLE I

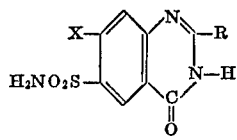

| Test compound | | Xanthine oxidase, percent inhibition |
|---|---|---|
| X | R | |
| Cl | H | 20 $2 \times 10^{-6}$ M |
| F$_3$C | H | 10 $2 \times 10^{-7}$ M |
| Cl | CH$_2$Cl | 47 |
| Cl | CH$_2$OH | 20 |
| Cl | CONH$_2$ | 25 |

What is claimed is:

1. A method which comprises orally administering to a mammal having an elevated blood uric acid level a dose sufficient to lower the blood uric acid level to normal for that species of a compound having the structure

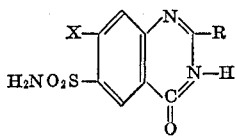

or a pharmacologically acceptable salt thereof wherein X represents chloro, bromo or trifluoromethyl and R represents hydrogen, $C_{1-5}$ alkyl, chloro-$C_{1-5}$ alkyl, hydroxy-$C_{1-5}$ alkyl, or carbamoyl.

2. A method as claimed in claim 1 wherein in the active product X is chloro.

3. A method as claimed in claim 1 wherein in the active product X is chloro and R is hydrogen.

4. A method as claimed in claim 1 wherein the active product X is trifluoromethyl.

5. A method as claimed in claim 1 wherein in the active product X is trifluoromethyl and R is hydrogen.

References Cited

UNITED STATES PATENTS

| 2,976,289 | 3/1961 | Cohen et al. | 260—256.5 |
| 3,214,429 | 10/1965 | Uskokovic et al. | 260—251 |
| 3,291,824 | 12/1966 | Uskokovic et al. | 260—518 |
| 3,065,235 | 11/1962 | Cohen et al. | 260—256.4 |
| 3,154,550 | 10/1964 | Fitchett | 260—251 |
| 3,201,398 | 8/1965 | Arlt et al. | 260—251 |
| 3,165,518 | 1/1965 | Arlt et al. | 260—256.5 |
| 2,952,680 | 9/1960 | Novello | 424—251 |
| 3,072,656 | 1/1963 | Warner | 424—251 |
| 3,098,009 | 7/1963 | Gallagher et al. | 424—251 |
| 3,539,570 | 11/1970 | Shetty | 424—251 |
| 3,541,096 | 11/1970 | Shetty | 424—251 |
| 3,092,631 | 4/1963 | Song et al. | 260—251 |

FOREIGN PATENTS

| 762,996 | 3/1970 | Belgium. |
| 2,131,622 | 5/1972 | Germany. |
| 317 | 4/1963 | Ireland. |

STANLEY J. FRIEDMAN, Primary Examiner